(12) United States Patent
Asbell et al.

(10) Patent No.: US 6,659,694 B1
(45) Date of Patent: Dec. 9, 2003

(54) CUTTER INSERT MOUNTING AND METHOD

(75) Inventors: Joey L. Asbell, Dubois, IN (US); Donald R. Franchville, Birdseye, IN (US); Jeffrey A. Jahn, Ferdinand, IN (US)

(73) Assignee: North American Products Corporation, Jasper, IA (US)

( * ) Notice: Subject to any disclaimer, the term of this patent is extended or adjusted under 35 U.S.C. 154(b) by 79 days.

(21) Appl. No.: 10/030,807

(22) PCT Filed: Jul. 27, 2000

(86) PCT No.: PCT/US00/20462
§ 371 (c)(1),
(2), (4) Date: Jan. 11, 2002

(87) PCT Pub. No.: WO01/08839
PCT Pub. Date: Feb. 8, 2001

Related U.S. Application Data
(60) Provisional application No. 60/146,551, filed on Jul. 30, 1999.

(51) Int. Cl.$^7$ .............................. B23B 27/16; B23C 5/20
(52) U.S. Cl. ............................................ 407/40; 407/63
(58) Field of Search .............................. 407/40, 63, 56, 407/59, 61, 113, 114, 115; 144/230, 241

(56) References Cited

U.S. PATENT DOCUMENTS

| | | | | |
|---|---|---|---|---|
| 4,035,890 A | * | 7/1977 | Eriksson et al. | 407/104 |
| 4,648,760 A | * | 3/1987 | Karlsson et al. | 408/223 |
| 4,790,693 A | * | 12/1988 | Koblesky | 407/35 |
| 4,844,666 A | * | 7/1989 | Tsujimura et al. | 407/34 |
| 5,443,334 A | | 8/1995 | Pantzar | |
| 5,603,365 A | | 2/1997 | Stewart | |
| 6,126,366 A | * | 10/2000 | Lundblad | 407/102 |

* cited by examiner

Primary Examiner—Daniel W. Howell
Assistant Examiner—Brian D. Walsh
(74) Attorney, Agent, or Firm—Barnes & Thornburg

(57) ABSTRACT

A cutter head having blade unit mounting cavities with spaced-apart mounting points and a blade unit. Each blade unit has at least one blade edge and is configured to have the blade edge disposed to align with the blade edge of another blade unit each in other mounting cavities. This forms a substantially helical blade when each blade unit is secured adjacent at least one of the spaced-apart mounting points.

10 Claims, 3 Drawing Sheets

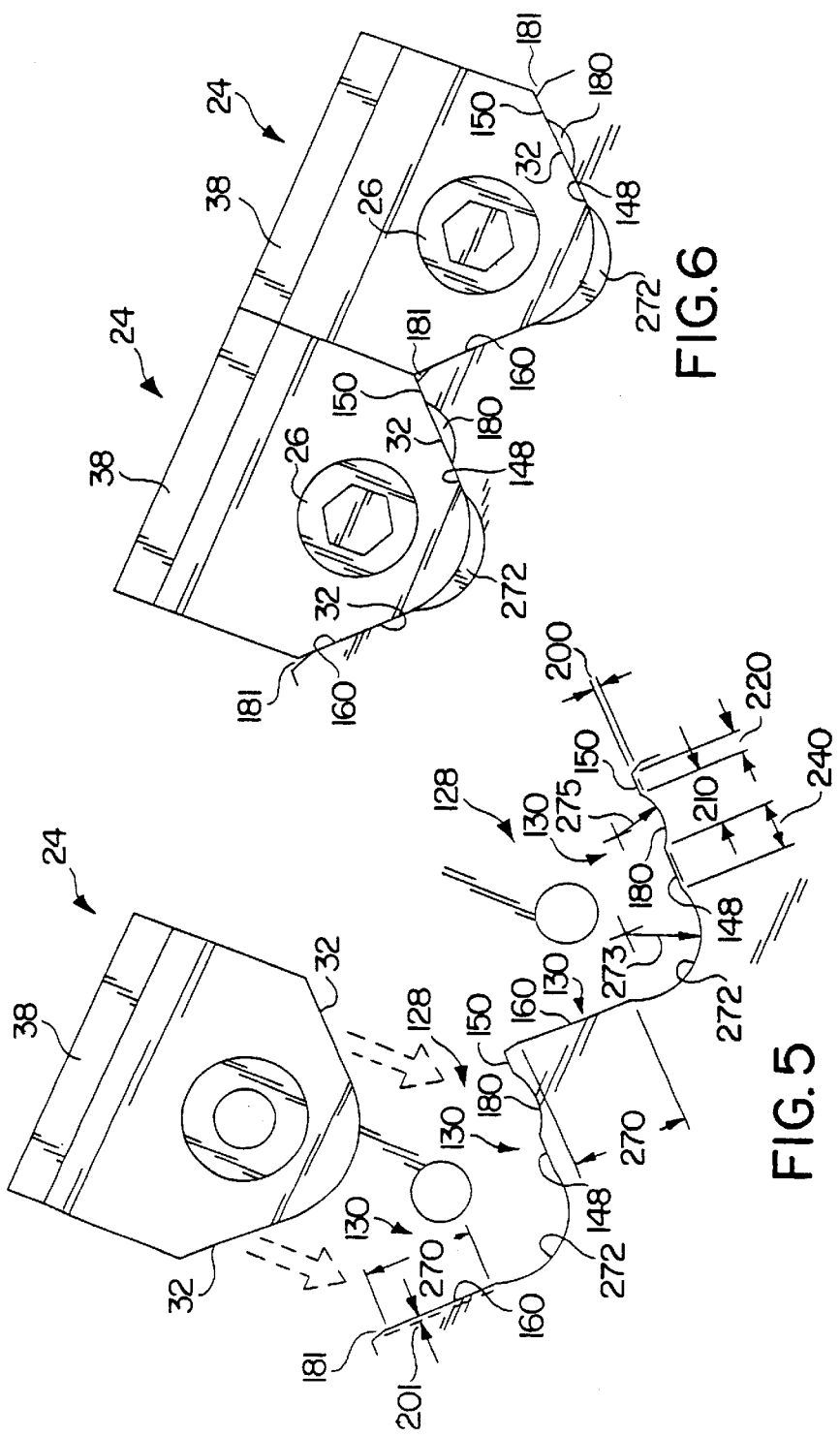

CUTTER INSERT MOUNTING AND METHOD

Cross-References to Related Applications

This application is a U.S. national counterpart application of international application Ser. No. PCT/US00/20462 filed Jul. 27, 2000, which claims priority to U.S. provisional application Ser. No. 60/146,551 filed Jul. 30, 1999.

FIELD OF THE INVENTION

The present invention relates to helical cutters. More particularly, the present invention relates to improvements of helical cutters of the type disclosed in the John S. Stewart U.S. Pat. Nos. 5,603,365 and 5,738,156, the disclosures of which are incorporated herein by reference.

BACKGROUND AND SUMMARY OF THE INVENTION

The Stewart U.S. Pat. Nos. 5,603,365 and 5,738,156 and the prior art references cited therein, are incorporated herein for the purposes of teaching the nature of such helical cutter heads, the mounting of inserts in helical arrangements on such cutter heads, and the specifically disclosed cutters or blade units. Reference is made to FIG. 5 in U.S. Pat. No. 5,603,365, for example, which shows a triangular shaped cutter or blade unit 24 having a cutting edge 38 formed on a raised portion 39 along one edge. The blade unit has sides 32 which engage or butt against the flat raised portions 30 of the triangular cavities or recesses in the cutter. As pointed out in these prior patents, the blade unit 24 may be made from materials selected from the group consisting of diamond, ceramic, carbide, high cobalt alloys, and high speed steel. The cylindrical cutter or the cutter head inserts disclosed in U.S. Pat. No. 5,603,365 may be made from ordinary steel which is relatively easier to fabricate. FIGS. 5 and 6 of U.S. Pat. No. 5,738,156 show a preferred structure in which individual blade units 24 are mounted directly into triangular recesses formed in helical patterns on the cylindrical cutter.

It has been determined that very significant and substantial increases in repeatability are obtained by having one of the two sides 32 mount against one point while the other side 32 mounts against two-points. The blade unit 24 is provided with a smooth, flat bottom which slides on a smooth flat recess surface. The three-point contact on the sides 32 of the blade unit 24 gives accuracy and repeatability in positioning. This three-point mounting system removes the variability of the cutters 24 which are typically provided by a vendor of carbide blades. Even with typical variability, the three-point mounting of the present invention works accurately to position the blade units.

While a three-point mounting with a triangular blade, such as the blade 24, is preferable, it will be appreciated that blades having different shapes may be positioned against three spaced-apart points accurately to position the blades in helically disposed recesses. Preferably, the cutter will be machined or otherwise formed to have recesses providing flat, upwardly facing surfaces for receiving blade units having flat, smooth bottoms to slide on such surface with the blade unit abutting the three-points.

While the structure shown in Stewart U.S. Pat. Nos. 5,603,365 and 5,738,156 have been found to be very good structures, the present invention provides spectacular structures with a significant increase in the ability to produce a high quality cutter head which is consistently repeatable. It will be appreciated from the disclosure of the prior U.S. Pat. Nos. 5,603,365 and 5,738,156 that the present invention provides a helical cutting edge about a cylindrical cutter with the edge being provided by a plurality of triangular blade units received in helically arranged recesses. The present invention improves the mounting of the triangular blade units by mounting the sides 32 against three-points, rather than against two flat surfaces, as taught by U.S. Pat. Nos. 5,603,365 and 5,738,156, as well as provide greater accuracy and repeatability in positioning.

Accordingly, the present invention provides a cutter head for an industrial woodworking machine, the cutter head including a generally cylindrical portion, a plurality of circumferential, spaced grooves extending into the cutter head body from the periphery of the cylindrical portion. The grooves include a plurality of blade unit mounting cavities. Each of the blade unit mounting cavities comprises a hole and spaced-apart mounting points. The hole receives a fastener to removably secure a blade unit in each of the mounting cavities. Each blade unit comprises at least one blade edge and is configured to have the blade edge disposed to align with the blade edges of other blade units in other mounting cavities. This forms a substantially helical blade when each blade unit is secured adjacent at least one of the spaced-apart mounting points.

The cutter head may also provide a helical series of triangular pockets formed therein with each pocket having two inwardly facing walls, a mounting point on one wall and two mounting points on the other wall to provide three spaced mounting points. In addition, each pocket has a hole to receive a fastener to secure the blade unit. Furthermore, the blade unit is triangular with a flat, smooth bottom, a blade edge and two sides and configured to have the blade edge disposed to align with another blade unit in other mounting cavities. This forms a substantially helical blade when each blade unit is secured to its mounting cavity in a cutter head, when seated in the triangular pocket with said sides abutting the mounting points.

A method of changing blades in a cutter head for an industrial woodworking machine may be provided. The cutter head includes a generally cylindrical portion, a plurality of circumferential and spaced grooves extending into the cutter head body from the periphery of the cylindrical portion. The grooves include a plurality of removable blade unit mounting cavities adapted to receive removable blade units. The method comprises removing blade units from the blade unit mounting cavities, including loosening fasteners securing the blade units to the blade unit mounting cavities. The method also includes mounting replacement blade units in the blade unit mounting cavities by inserting blade units into the blade unit mounting cavities, and urging faces of each of the blade units against positioning points of each of the mounting cavities. The screws are then tightened by securing the blade units to the blade unit mounting cavities forming a substantially helical blade made up of blade units secured to the cutter head.

Another method of changing blades in a cutter head for an industrial woodworking machine comprises removing blade units from the blade unit mounting cavities, and mounting replacement blade units in the blade unit mounting cavities to be against three separate mounting points provided by each cavity.

Additional features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The present invention will be described hereinafter with reference to the attached drawings which are given as non-limiting examples only, in which:

FIG. 5 is a detail view of the cutter head of FIG. 1 with an improved cutter head recess and a cutter head insert spaced-apart from same; and FIG. 6 is another detail view of the cutter head of FIG. 5 with the cutter head positioned in the improved recess.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE DRAWINGS

Figure 1:
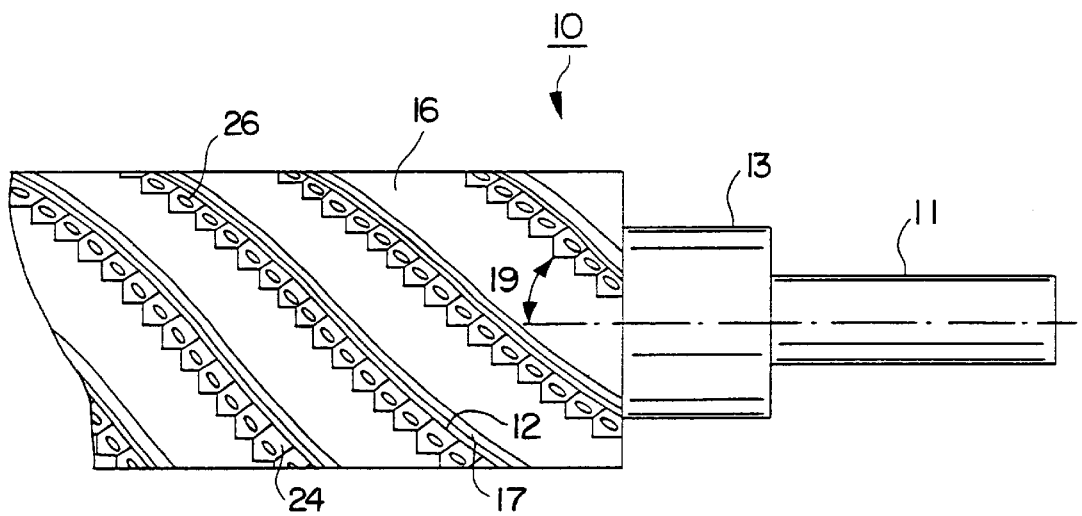
FIG. 1 is a side view of a cutter head as shown in FIG. 6 of the Stewart U.S. Pat. No. 5,738,156.
Figure 2:
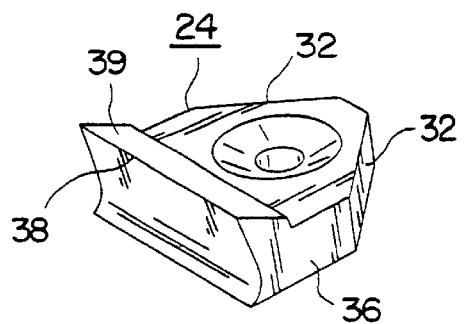
FIG. 2 is an enlarged perspective view of an individual blade unit as shown in FIG. 6 of the Stewart U.S. Pat. No. 5,738,156.
Figure 4:
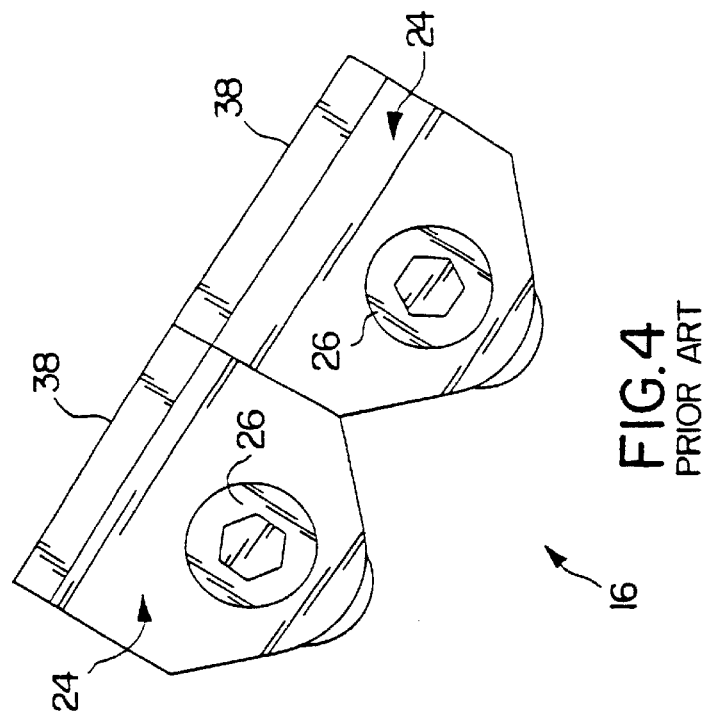
FIG. 4 is another detail view of the cutter head recess and cutter head insert of FIG. 3 with the cutter head insert positioned in the recess.
Figure 3:
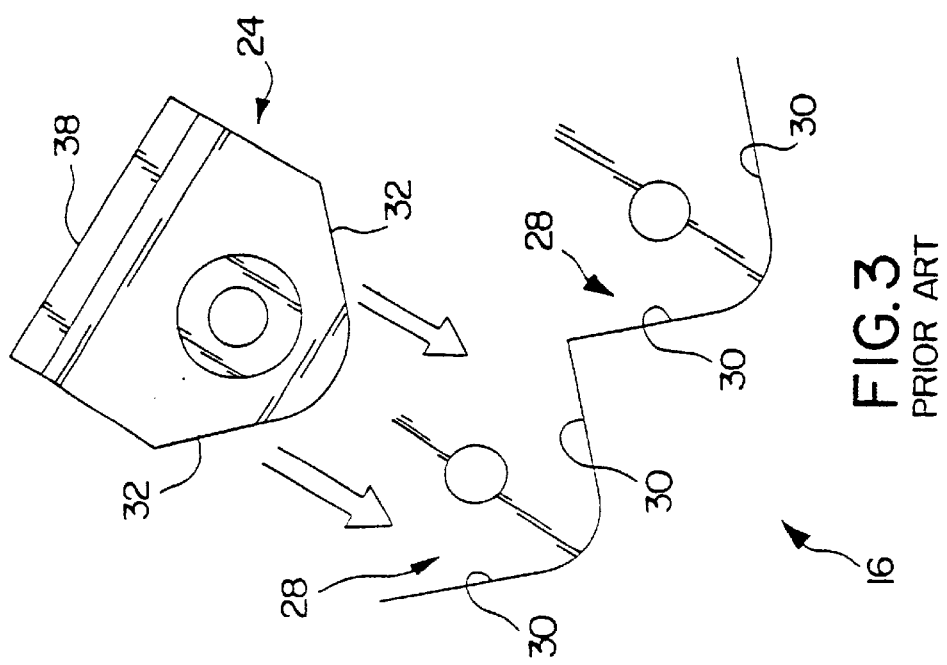
FIG. 3 is a detail view of a cutter head recess and a cutter head insert from FIGS. 1 and 2 with the cutter head insert spaced apart from the recess.

FIGS. 1 through 4 show the existing art of a cutter head 10 with the recesses or triangular pockets 28 having flat raised portions 30. The cutter head is provided with an axial extending stub-shaft end 11, an intermediate section 13 and a main body 16 axially extending from the intermediate body 13. Cylindrical body 16 is provided with a series of helical grooves or indentations 17 in circumferentially spaced relationship throughout.

The blade units 24 are provided with flat sides 32 for engaging, respectively, the flat sides 30 of the recess. (See FIGS. 2 through 4.) It will be 30 appreciated that the recesses or pockets 28 are arranged in a helical pattern about the cylindrical body of cutter head 10 as shown in FIG. 1. Such a cutter head is also shown in FIG. 6 of U.S. Pat. No. 5,738,156. Each triangular blade unit 24 is provided with a cutting edge 38 which is preferably ground with a curved edge. When the triangular recesses 28 are filled with triangular blade units 24 as described in U.S. Pat. No. 5,738,156, the edges 38, each one of which is a straight edge, forms a helical cutter blade 12. In the illustrated embodiment, the helical cutter blade 12 forms a helical angle 19 of about 30 degrees. It is appreciated, however that any conventional helical angle for such cutter heads would also be sufficient.

Referring to FIGS. 5 and 6, it will be seen that, within the present invention, identical cutter blades 24 may be used in pockets 128 that are formed with sides 130 best seen in FIG. 5. One of these two sides 130 is provided with two-points 148, 150, while the other side 130 is provided with a single point 160. In the illustrated embodiment, the side that is provided with the two-points 148, 150, will be the side that will be positioned on the cutter head so as to move in a direction generally opposite the direction of an article (not shown) being cut. It will be appreciated that, in accordance with the present invention, the side walls 130 may be modified to provide seating points, or seating lands, or protrusions having various configurations. It will be further appreciated that in the following example the recited "points" 148, 150 and 160 are essentially lands or protrusions being discreet locations against which sides 32 rest.

When the blade unit 24 is against the walls 130 as depicted in FIG. 6, and a fastening element 26 is used in accordance with the prior Stewart Pat. Nos. 5,603,365 and 5,738,156 to hold the blade unit in position, the blade unit is securely and accurately positioned to position the cutter edge 38 in proper alignment with the adjacent cutter edges 38 to provide a helical cutting edge 12 about the periphery of the cutter head cylinder 10 as previously discussed.

EXAMPLE

The present invention will now be described with respect to the following example. This example is intended to be only representative of the manner in which the principles of the present invention may be implemented in an actual embodiment. In addition, this example is not intended to be an exhaustive representation of the present invention. Nor is the following example intended to limit the present invention only to the precise form which is herein exemplified.

FIG. 5 shows that points 148, 150 and 160 project outwardly 0.020 inch (0.051 cm) as indicated by reference numerals 200 and 201. (See also recess 181.) Points 148 and 150 are spaced apart 0.1342 inch (0.341 cm) as indicated by reference numeral 210. Point 148 has a width of 0.1568 inch (0.398 cm) as indicated by reference numeral 240. Point 150 has a width of 0.0876 inch (0.223 cm) as indicated by reference numeral 220. Point 160 has a width of 0.2378 inch (0.604 cm) as indicated by reference numeral 270. Recess 272 has a radius of 0.300 inch (0.762 cm) as indicated by reference numeral 273. And recess 180 has a radius of 0.2500 inch (0.635 cm) as indicated by reference numeral 275.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as set forth in the attached claims.

What is claimed is:

1. A cutter head for an industrial woodworking machine, the cutter head including a generally cylindrical portion, a plurality of circumferential, spaced helical grooves extending into the cylindrical portion, said grooves including a plurality of blade unit mounting cavities, a blade unit for each cavity, and a fastener to removably secure one of the blade units in each of the mounting cavities, each of the blade unit mounting cavities comprising:

a hole to receive the fastener to removably secure one of the blade units in each of the mounting cavities, and at least two spaced-apart mounting protrusions;

each blade unit comprising one blade edge and configured to have the blade edge disposed to align with the blade edges of other blade units in other mounting cavities forming a substantially continuous helical blade when each blade unit is secured in its cavity.

2. The invention of claim 1, wherein each blade unit is a triangularly shaped blade unit with a blade disposed along a first side and flat surfaces disposed along the second and third sides.

3. The invention of claim 2, wherein the flat surfaces abut the spaced-apart mounting points.

4. A cutter head for an industrial woodworking machine, the cutter head including a generally cylindrical portion, a plurality of circumferential, spaced helical grooves extending into the periphery of the cylindrical portion, said grooves including a plurality of blade unit mounting cavities spaced along the grooves, a blade unit for each cavity, and a fastener to removably secure one of the removable blade units in each of the mounting cavities, each of the blade unit mounting cavities comprising:

a triangular pocket formed to have two inwardly facing walls, a mounting protrusion on one wall, and two mounting protrusions on the other wall to provide three spaced mounting protrusions; and a hole disposed in each of the pockets configured to receive the fastener to secure one of the blade units;

wherein each blade unit is triangular with a flat, smooth bottom, a blade edge and two sides, and configured to have the blade edge disposed to align with other blade edges in other mounting cavities to form a substantially continuous helical blade.

5. The invention of claim 4, wherein the inwardly facing walls are configured such that the two points resist a force exerted on the cutter head while cutting an article.

6. A method of changing blades in a cutter head for an industrial woodworking machine, the cutter head including a generally cylindrical portion, a plurality of circumferential, spaced helical grooves extending into the cutter head body from the periphery of the cylindrical portion, said grooves including a plurality of removable blade unit mounting cavities adapted to receive removable blade units, comprising:

removing the blade units from their blade unit mounting cavities including loosening fasteners securing the blade units to the blade unit mounting cavities, and mounting replacement blade units in the blade unit mounting cavities by inserting the blade units into their blade unit mounting cavities, urging faces of each of the blade units against at least two separate mounting protrusions of each of the mounting cavities, and tightening screws securing the blade units to their blade unit mounting cavities so as to form a substantially helical blade made up of the blade units secured to the cutter head.

7. The method of claim 6, further comprising urging faces of the blade units against positioning points of the mounting cavities positioned to resist a force exerted on the cutter head during cutting of an article.

8. A method of changing blades in a cutter head for an industrial woodworking machine, the cutter head including a generally cylindrical portion, a plurality of circumferential, spaced helical grooves extending into the cutter head body from the periphery of the cylindrical portion, said grooves including a plurality of removable blade unit mounting cavities spaced along the grooves adapted to receive removable blade units, comprising:

removing the blade units from their blade unit mounting cavities, and mounting replacement blade units in the blade unit mounting cavities to be against three separate mounting protrusions provided by each cavity.

9. The method of claim 8, further comprising urging faces of the blade units against one mounting point on a first, inwardly facing wall and against two mounting points on a second, inwardly facing cavity.

10. The method of claim 9, further comprising urging one of the faces of the blade units against the two positioning points positioned to resist a force exerted on the cutter head during cutting of an article.

* * * * *